United States Patent [19]

Galloway

[11] Patent Number: 5,430,709
[45] Date of Patent: Jul. 4, 1995

[54] NETWORK MONITORING METHOD AND APPARATUS

[75] Inventor: James R. Galloway, Jettingen, Germany

[73] Assignee: Hewlett-Packard Company, Palo Alto, Calif.

[21] Appl. No.: 190,183

[22] PCT Filed: Jun. 17, 1992

[86] PCT No.: PCT/GB92/01090

§ 371 Date: Feb. 8, 1994

§ 102(e) Date: Feb. 8, 1994

[87] PCT Pub. No.: WO93/26111

PCT Pub. Date: Dec. 23, 1993

[51] Int. Cl.$^6$ .............................................. H04J 3/14
[52] U.S. Cl. ........................................ 370/13; 379/113
[58] Field of Search .................... 370/13, 14, 17, 53, 370/58.1, 62, 94.1; 379/111, 112, 113, 114, 117, 118, 121, 133, 134; 340/825.15

[56] References Cited

U.S. PATENT DOCUMENTS

| | | | |
|---|---|---|---|
| 4,788,721 | 11/1988 | Krishnan et al. | 379/113 |
| 5,042,027 | 8/1991 | Takase et al. | 379/133 |
| 5,101,402 | 3/1992 | Chiu et al. | 370/17 |
| 5,231,593 | 7/1993 | Notess | 379/113 |

FOREIGN PATENT DOCUMENTS

| | | |
|---|---|---|
| 0467569 | 1/1992 | European Pat. Off. . |
| 0478175 | 4/1992 | European Pat. Off. . |

OTHER PUBLICATIONS

"Methods for Internet Monitoring", 10th Conference on Local Computer Networks, IEEE, New York, Oct. 7, 1985, pp. 32–40.

*Primary Examiner*—Benedict V. Safourek

[57] ABSTRACT

A network monitoring method and apparatus (61) is disclosed for monitoring communication connections temporarily established over a network (60) between respective pairs of entities for passing protocol data units therebetween. The connections are, for example, conducted in accordance with the TCP/IP protocol suite. The method involves the steps of monitoring the network to identify the protocol data units and the connection to which each such unit relates, and maintaining an active group (67) of call records each representing a respective connection considered to be currently active. The active group (67) of call records is maintained by adding a new call record to the group each time a protocol data unit is identified as relating to a connection unrepresented in the active group (67); updating an existing call record in the group (67) in response to any further protocol data units being identified as relevant to the connection represented by that record; and removing an existing call record from the active group to a completed-call group (69) when the corresponding connection is judged completed having regard to a continuing absence of further protocol data units relevant to that connection.

11 Claims, 7 Drawing Sheets

NETWORK MONITORING METHOD AND APPARATUS

TECHNICAL FIELD

The present invention relates to a method and apparatus for monitoring communication connections established over a network and in particular, but not exclusively, to the generation of call records for connections conducted in accordance with the TCP/IP protocols.

BACKGROUND ART

Entities communicating with each other over a data communications network generally do so by the exchange of data packets in accordance with a predetermined protocol. Depending on the particular protocol used, the communication service provided between the entities will generally be either connectionless or connection-oriented. A connectionless service is one in which each packet is handled in isolation from any other packet, the service having no appreciation of whether or not the packet is one of a number of packets that together form a complete message. In contrast, a connection-oriented service will establish a virtual circuit between entities that wish to communicate, in order to provide a reliable stream transport service for the packets passed between the entities, the virtual circuit being closed when the entities have finished communicating with each other; such a communication path established between entities over a virtual circuit is generally referred to as a connection whilst the communication transaction carried out from the setting up to the taking down of a connection is often referred to as a call.

It is well known to provide network monitoring equipment both for the purpose of traffic monitoring and for the purpose of fault analysis. Such monitoring equipment is mostly concerned either with analyzing individual packets or with the aggregate effect of the monitored packets as a whole (for example, for traffic estimation and network planning). U.S. patent specification No. 5,101,402 discloses a somewhat more sophisticated approach that provides for the collection of statistics on sessions conducted across connections. However, a drawback of the method disclosed in U.S. Pat. No. 5,101,402 is that it must track session protocol interactions in order to ascertain when each session terminates; as a consequence, if the passage of the relevant protocol command terminating a session is missed for any reason (such as noise or packet re-routing), an error condition will result.

It is an object of the present invention to provide a method and apparatus for monitoring calls over a network that is resilient to packet loss.

DISCLOSURE OF THE INVENTION

According to one aspect of the present invention, there is provided a method of monitoring communication connections temporarily established over a network between respective pairs of entities for passing protocol data units therebetween, each protocol data unit passed over the network being provided by the sending entity with associated connection information identifying the connection to which it relates, the method involving the steps of monitoring the network to identify said protocol data units and the connection to which each such unit relates, and maintaining an active group of call records each representing a respective said connection considered to be currently active, said maintaining step involving:

adding a new call record to said active group each time a said protocol data unit is identified as relating to a connection unrepresented in said active group;

updating an existing call record in said active group in response to any further said protocol data units being identified as relevant to the connection represented by that record; and removing an existing said call record from said active group when said connection is judged completed having regard to a continuing absence of further protocol data units relevant to said connection.

Generally, the call records removed from the active group are retained as a completed-call group of records thereby providing a historical record of calls made. Furthermore, each call record will normally record aggregated quantitative information (for example, number of data bytes transferred) for the protocol data units relevant to each direction of data flow between the pair of entities involved in the connection to which the record relates.

The aforesaid associated connection information of each protocol data unit may, for example, comprise the network addresses of each of the entities of the pair of entities associated with the connection to which the protocol data unit relates; in this case, the step of monitoring the network preferably involves identifying the connection to which each protocol data unit relates by forming a connection identifier from the network addresses contained in the associated connection information in a manner such that the connection identifier has a form that is independent of the direction of passage of the protocol data unit between the entities, the connection identifier being used in said maintaining step to identify the corresponding call record.

To facilitate the removal of call records from the active group, each call record in the active group is preferably provided with a respective activity indicator which is set when the record is created and when the record is updated. The removal of call records from the active group is then effected by checking the call records of the active group at intervals and each time removing those records whose activity indicators are in a reset state and resetting the activity indicators of the remaining call records.

Where at least some of the protocol data units have associated control codes relevant to the progression of the connections to which they relate, the step of monitoring the network preferably includes identifying these control codes and storing them as part of the associated call record; this then enables call fragments erroneously identified as separate calls, to be subsequently pieced together by scanning the call records of the completed-call group for records relating to connections between the same pair of entities, and determining from the control codes stored in such records whether the records fit together as partial records of the same connection.

Preferably, each call record includes a start-of-call information item set upon creation of that record to indicate a start time of the corresponding connection, and an end-of-call information item which is updated for each protocol data unit subsequently identified as relevant to that record to indicate a potential end time of the corresponding connection. To this end, the step of monitoring the network advantageously involves associating a respective time stamp with each said protocol data unit that is identified in that step; the start-of-call information item of each call record is then set to the time stamp of the protocol data unit causing the call record to be created, and the end-of-call information item of the same record is set in turn to the time stamp of each successive protocol data unit identified as relevant to the connection concerned.

Where at least some of said protocol data units have associated control codes relevant to the establishment of the connections to which they relate, each call record may include the identity of the entity initiating the corresponding connection, the control codes associated with the protocol data unit causing a new call record to be added to the active group serving to indicate which of the two communicating entities involved with a connection initiated the connection.

According to another aspect of the present invention, there is provided apparatus for monitoring communication connections temporarily established over a network between respective pairs of entities for passing protocol data units therebetween, each protocol data unit passed over the network being provided by the sending entity with associated connection information identifying the connection to which it relates, said apparatus comprising monitoring means for monitoring the network to identify said protocol data units and the connection to which each such unit relates, and call-record means connected to said monitoring means and operative to maintain an active group of call records each representing a respective said connection considered to be currently active, said call-record means comprising:

storage means for storing said active group of call records, record-creation means for determining whether the said connection to which each said protocol data unit relates, as identified by said monitoring means, is represented by a said call record in said active group, and where said connection is determined to be unrepresented by a said call record, adding a new call record to said active group;

record-updating means for updating an existing call record in said active group in response to any further said protocol data units being identified by said monitoring means as relevant to the connection represented by that record; and record-removal means for removing an existing said call record from said active group when said connection is judged inactive having regard to when the last protocol data unit relevant to said connection was identified.

The method and apparatus of the invention are particularly suited to call record generation where communication is effected using the TCP/IP protocol suite.

BRIEF DESCRIPTION OF THE DRAWINGS

A call record generator embodying the present invention and a network monitoring method in accordance the invention, will now be particularly described, by way of non-limiting example, with reference to the accompanying diagrammatic drawings, in which.

BEST MODE FOR CARRYING OUT THE INVENTION

Figure 1:
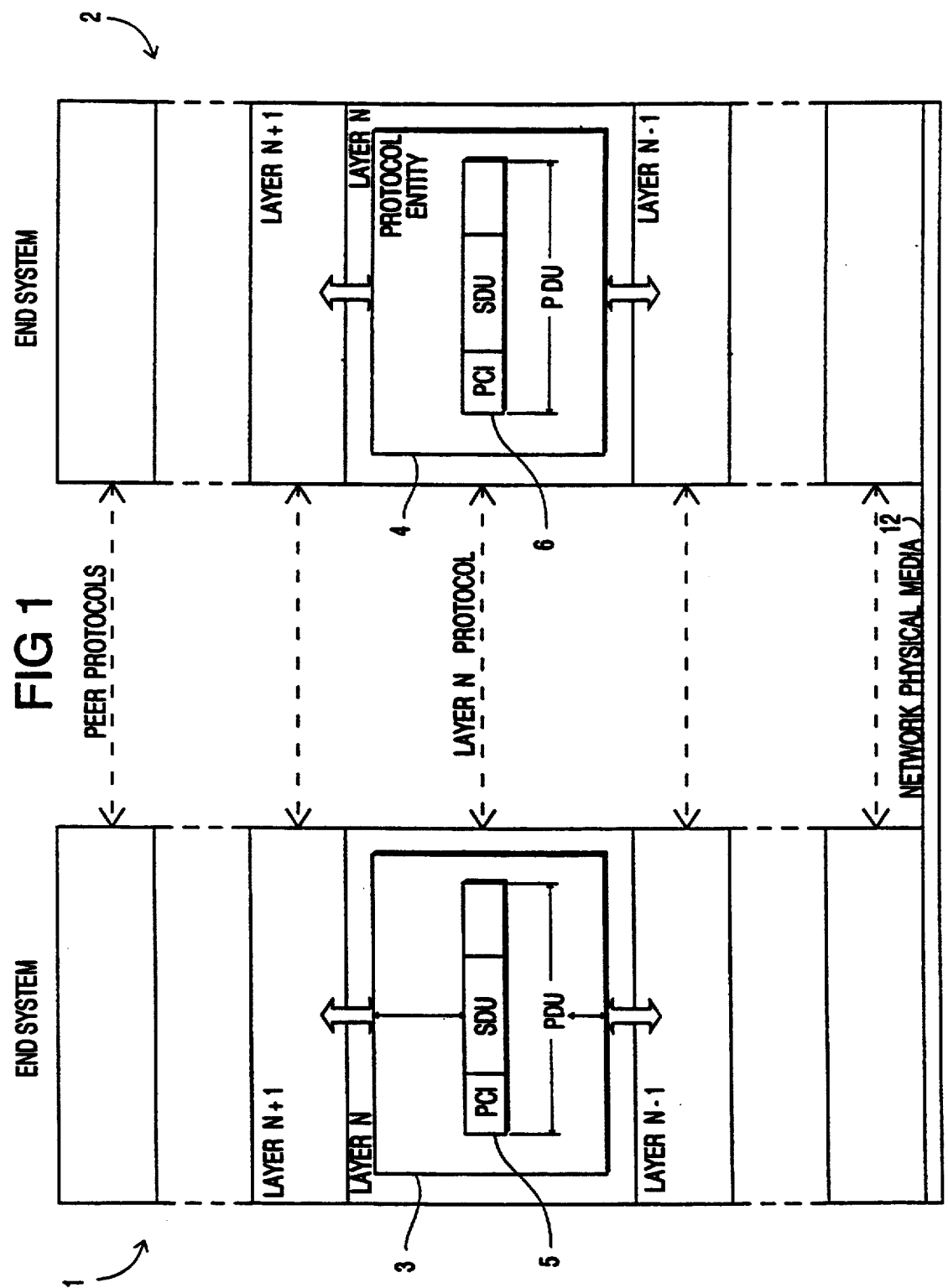
FIG. 1 is a diagram illustrating protocol stacks of two communicating end systems.

FIG. 1 of the accompanying drawings shows conceptual protocol stacks 1 and 2 operated by two end systems in communicating with each other over a network (12). Each protocol stack 1,2 is made up of a number of different layers each of which performs a particular task in the communication process. Considering by way of explanation, layer N in each protocol stack 1,2, this layer N provides services to the layer above (layer N+1) and in doing so utilizes services provided by the layer below (layer N−1).

Within each layer N a protocol entity 3,4 controls the carrying out of the communication tasks assigned to that layer, this control being effected in coordination with the corresponding protocol entity of the communicating end system. Conceptually the protocol entities 3,4 in the same protocol layer of the communicating end systems communicate and coordinate with each other in accordance with a peer protocol (for layer N this is the layer N protocol shown in FIG. 1). The peer protocol defines the form and sequencing of messages passed between the peer protocol entities 3,4 in the form of protocol data units 5,6. Each protocol data unit (PDU) 5,6 contains protocol control information PCI and one or more service data units SDU, the latter being data which the layer N protocol entity is handling on behalf of the layer N+1 above.

Whilst conceptually the peer protocol entities 3,4 are communicating with each other by passing protocol data units directly between themselves, in practice, of course, the protocol data units must pass down one protocol stack, across the network 12 and up the other protocol stack to the relevant layer N. A protocol data unit passed by the protocol entity of layer N down to layer N−1 is treated by that latter layer as a service data unit SDU and handled appropriately.

Such conceptual layering of communication protocol stacks is well known in the art—see, for example, the seven-layer OSI (Open Systems Interconnect) model defined by the International Standards Organization (International Standard ISO7498). It will be appreciated that in practice the protocol stacks are implemented primarily in software, although the lower levels may well be effected using dedicated hardware.

Each peer protocol may be connectionless or connection-oriented in form. If a peer protocol N is connectionless, the associated protocol entities 3, 4 handle each service data unit SDU passed down to them from layer N+1 as an isolated item; in contrast, if a peer protocol N is connection-oriented, the associated protocol entities 3,4 provide a reliable stream transport service for service data units SDUs passed down from the layer N+1. Generally, most of the peer protocols will be connectionless with one or two key peer protocols being connection oriented.

A protocol entity in layer N may be required to provide a service to a number of different protocol entities in the layer N+1 above. This generally requires that an entity in layer N+1 of a first end system, when sending a protocol dam unit PDU to its peer entity in a second end system, provides adequate identification of the destination peer entity to the layer N service—providing entity of the first end system, so that the peer entity in layer N of the second end system can forward the PDU to the appropriate entity in layer N+1.

A protocol entity in, for example, layer N+1 of one end system may also be required to communicate with peer entities in a number of other end systems. In this case, where the layer N protocol is connection-oriented, then, of course, it is inadequate for the layer N protocol entity to keep track of its current connections by simply by reference to the identity of the destination layer N+1 entity. Instead, connections are frequently identified by reference to the combination of source and destination entity identities.

The present invention relates to communications between entities, for example in layer N+1, by the transfer of protocol data units using the services of the layer-N protocol entities, where the layer N peer protocol is connection-oriented. In the following description, the well known transmission control protocol TCP is used as an example of a connection-oriented protocol, this protocol being used in conjunction with the Internet Protocol IP.

In TCP/IP networks, TCP-layer entities use pairings of endpoints to identify a connection, where an endpoint is the combination of a parameter (IP address) identifying the end system concerned (or, more accurately, an interface of the end system to the network), and a parameter (TCP port number) indicating the source/destination endpoint entity within the end system with which the TCP protocol entity is to communicate. A fuller explanation of TCP connection identification may be found in a reference work such as "Internetworking with TCP/IP", Douglas E. Comer, Volume 1, Second Edition 1991, Prentice-Hall.

Figure 2:
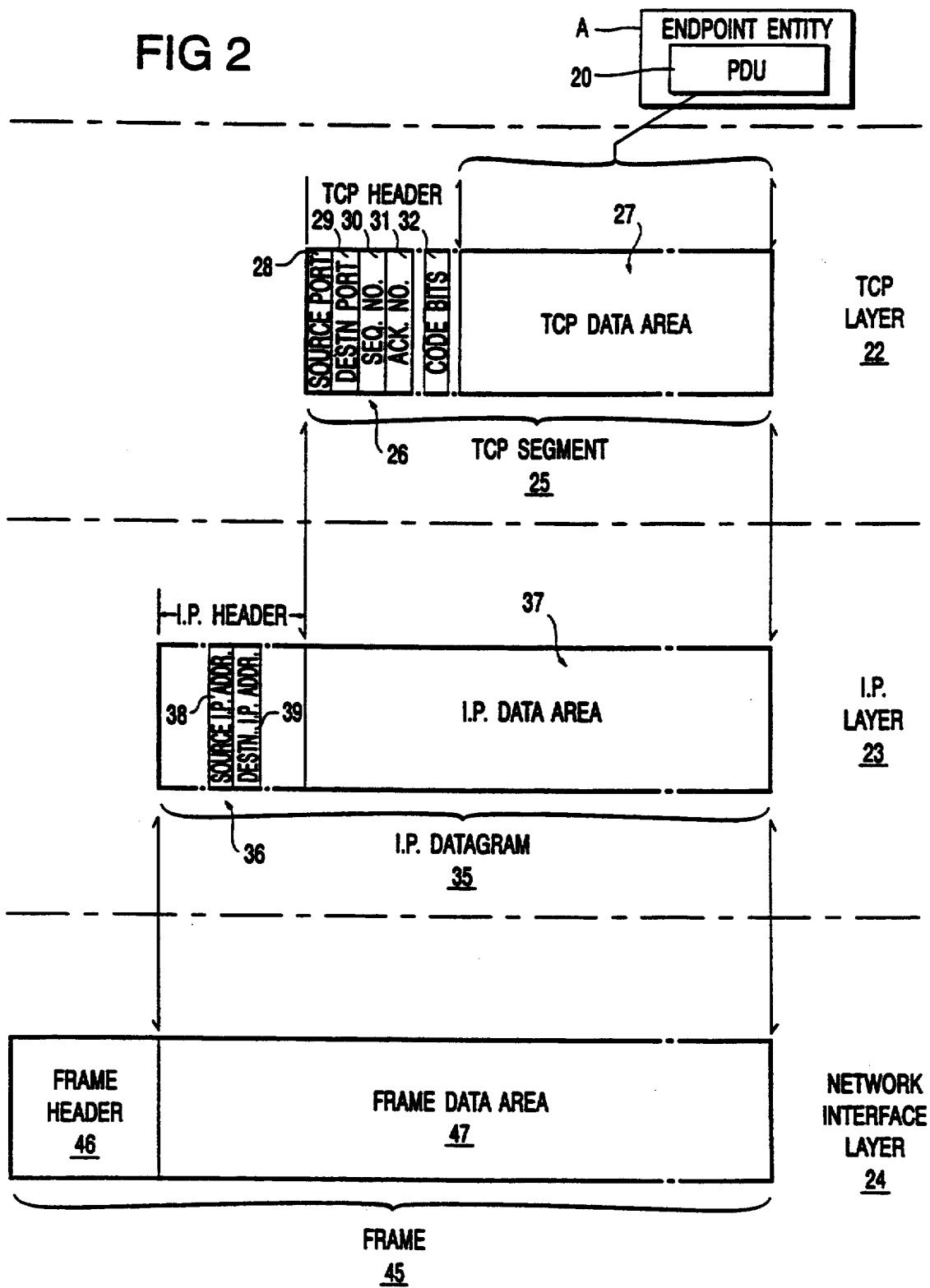
FIG. 2 is a diagram illustrating the encapsulation of data transmitted between communicating entities in accordance with the TCP/IP protocol suite.

FIG. 2 illustrates how a protocol data unit (PDU) 20 is prepared for transmission over a network from an endpoint entity A in one end system to a peer endpoint entity B (not shown) in another end system in accordance with the TCP/IP protocols, it being assumed that an appropriate TCP connection has already been established. As can be seen, the PDU 20 is passed down through three protocol layers (TCP layer 22, IP layer 23, and network interface layer 24) before being sent across the network to the receiving end system. In each layer, an encapsulation process takes place as will be described more fully below; although not illustrated in FIG. 2 for reasons of simplicity, a fragmentation process may also occur in one or more layers with the data received by the layer being split up into several units before being passed to the next layer.

As illustrated in FIG. 2, the basic protocol data unit of the TCP layer protocol is the TCP segment 25 which comprises a TCP header 26 and a TCP data area 27. The PDU 20 passed down from the endpoint entity A to the TCP layer 22, constitutes a service data unit for the TCP layer 22 and forms the TCP data area 27 of a TCP segment 25. The TCP header 26 contains a number of information fields of which only those relevant to the present invention are illustrated, these being a source port field 28 holding the TCP port number of the endpoint entity A, a destination port field 29 holding the TCP port number of the destination endpoint entity B to which the PDU 20 is being sent, a sequence number field 30 containing a sequence number for the current TCP segment 25 in relation to other such segments for the same connection, an acknowledgement number field 31 for containing the sequence number of the segment next expected from the peer TCP layer 22 in relation to a current connection, and a code field 32 containing various control codes.

Each TCP segment 35 is passed down to the IP layer 23 as a service data unit of that layer. The basic protocol data unit of the IP layer 23 is the IP datagram 35 comprising an IP header 36 and an IP data area 37. The IP data area 37 is occupied by the service data unit received from the TCP layer 22, that is by the TCP segment 25. The fields of the IP header relevant to the present invention are a source IP address field 38 indicating the IP address of the sending end system, and a destination IP address field 39 containing the IP address of the receiving end system. The source and destination IP addresses are made available to the TCP layer 22 to enable the latter to identify connections based on the pairings of IP address and TCP port number for the source and destination endpoint entities.

In practice, there is frequently a one-to-one correspondence between TCP segments and IP datagrams with no fragmentation of TCP segments; for simplicity, such an arrangement is assumed hereinafter.

The network interface layer 24 serves to match the characteristics of the underlying physical transmission network to the higher-level layers. The network interface layer 24 is arranged to receive IP datagrams 35 as service data units. The basic protocol data unit of the network interface layer 24 is a frame 45 which comprises a frame header 46 and a frame data area 47. The frame data area is occupied by the service data unit received from the IP layer 23, that is by the IP datagram 35.

It will be appreciated that in the case illustrated in FIG. 2, each frame 45 appearing on the physical network contains the IP address and TCP port number of the source and destination endpoint entities using the services of the TCP layer 22 to communicate with each other, these parameters being sufficient to uniquely identify the TCP connection involved. In practice, each IP datagram may be fragmented across several frames; however, generally the frame carrying the first fragment of an IP datagram will be of sufficient size that this fragment includes not only the datagram header, but also the TCP header of the TCP segment encapsulated in the datagram; this is assumed to be the case for the purposes of the following description.

Figure 3:
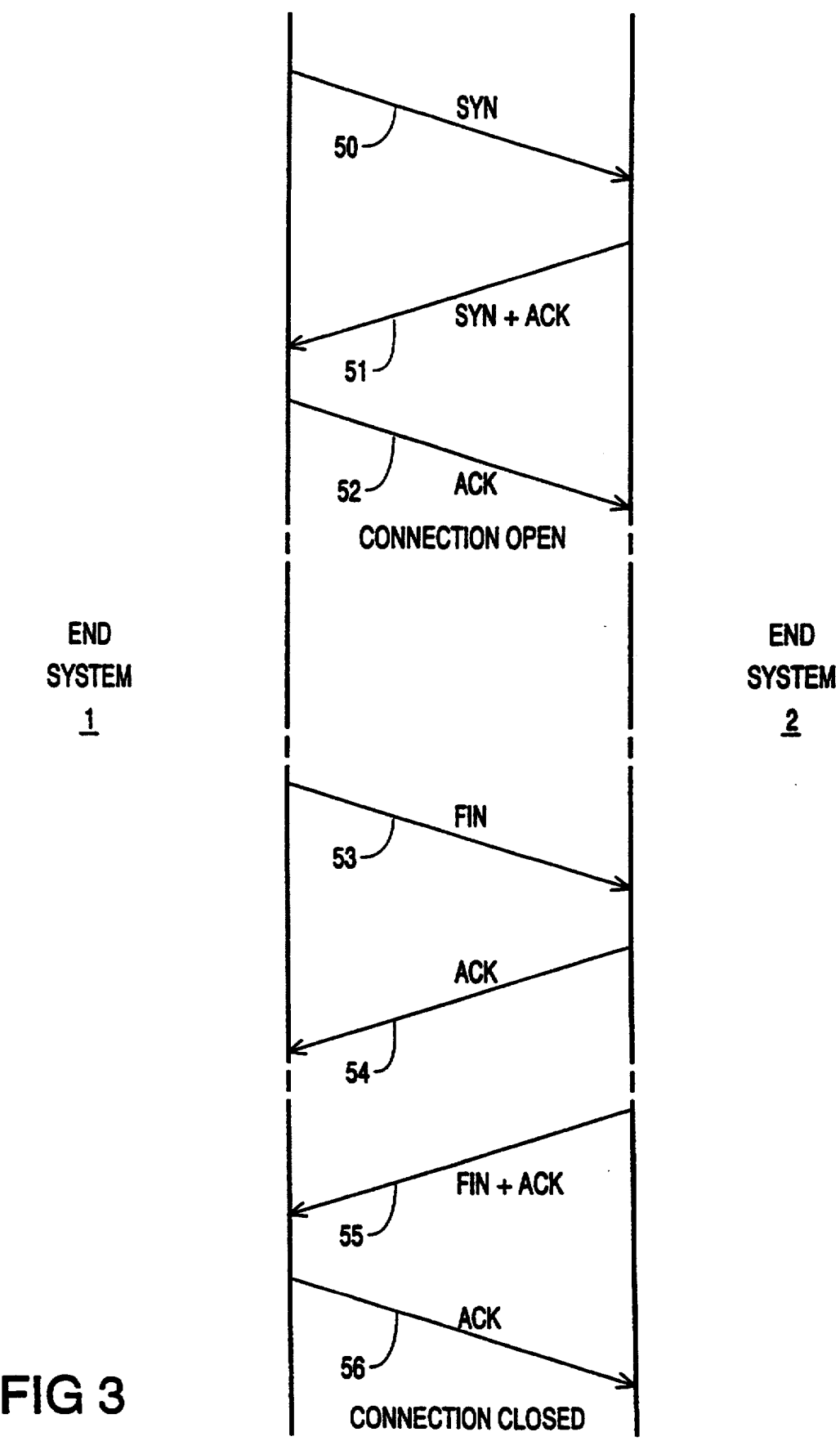
FIG. 3 is a diagram illustrating the exchange of control messages between end systems during the opening and closing of a TCP/IP connection.

As already discussed above, the TCP layer 22 provides a connection-oriented communication service to the layer above, that is to the endpoint entity A of FIG. 2. The overall progression of a communication between endpoint entities A and B is therefore as follows. Upon the endpoint entity A requesting the services of the TCP layer 22, the latter establishes a connection with the peer TCP layer in the end system containing the endpoint entity B. Once the connection is established, PDUs 20 are passed between the endpoint entity A and its peer entity B until both these entities have finished communicating. Thereafter, the TCP layer closes the connection. FIG. 3 illustrates the handshakes involved in establishing and closing down a TCP connection. In this Figure, TCP peer entities in end systems 1 and 2 are considered.

The top half of FIG. 3 shows the handshakes involved in opening a TCP connection. In the present example, the TCP layer entity in end system 1 initiates opening of the connection by sending a segment 25 to its peer entity in end system 2 with a SYN bit set in the code bits field 32 of the TCP header 26 (arrow 50). On receiving this segment, the TCP entity in end system 2 responds with the segment in which SYN and ACK bits are set (arrow 51 ). Successful receipt of this reply by the TCP entity in end system 1 results in a concluding handshake segment being sent from end system 1 to end system 2 in which the ACK bit in the code bits field 32 is set (arrow 52); this serves to inform the end system 2 that both sides have agreed that a connection has been established. During this handshake process, sequence numbers are sent and acknowledged to enable subsequent tracking of segments exchanged during reconnection. These sequence numbers and acknowledgement numbers are contained in fields 30 and 31 of the TCP header 26.

The lower half of FIG. 3 illustrates the handshakes involved in closing down a TCP connection. Closing a connection takes place in two stages with the connection first being closed in one direction when the sending TCP entity for that direction has no further data to communicate, and then subsequently in the other direction when the other TCP entity has finished sending data. In the FIG. 3 example, it is assumed that the TCP layer entity in end system 1 first wishes to close the connection and to do this it sends a segment 25 in which a FIN bit is set in the code bits field 32 of the TCP header 26 (arrow 53). The receipt of this segment is in due course acknowledged by the TCP entity in end system 2 by the return of a segment with the ACK bit set (arrow 54). The TCP entity in end system 2 then continues to send segments carrying data until no more dam remains to be communicated. At that time, the TCP entity in end system 2 sends a segment with the FIN and ACK bits set in the code bits field (arrow 55). Successful receipt of this segment by the TCP entity in end system 1 is acknowledged by a final segment 25 being sent with its ACK bit set (arrow 56).

It will be appreciated that in the course of any connection established between the TCP entities of end systems 1 and 2 there occurs a predetermined pattern of code bits in the code bit field 32 of successive segments as determined by the opening and closing handshakes illustrated in FIG. 3.

Figure 4:
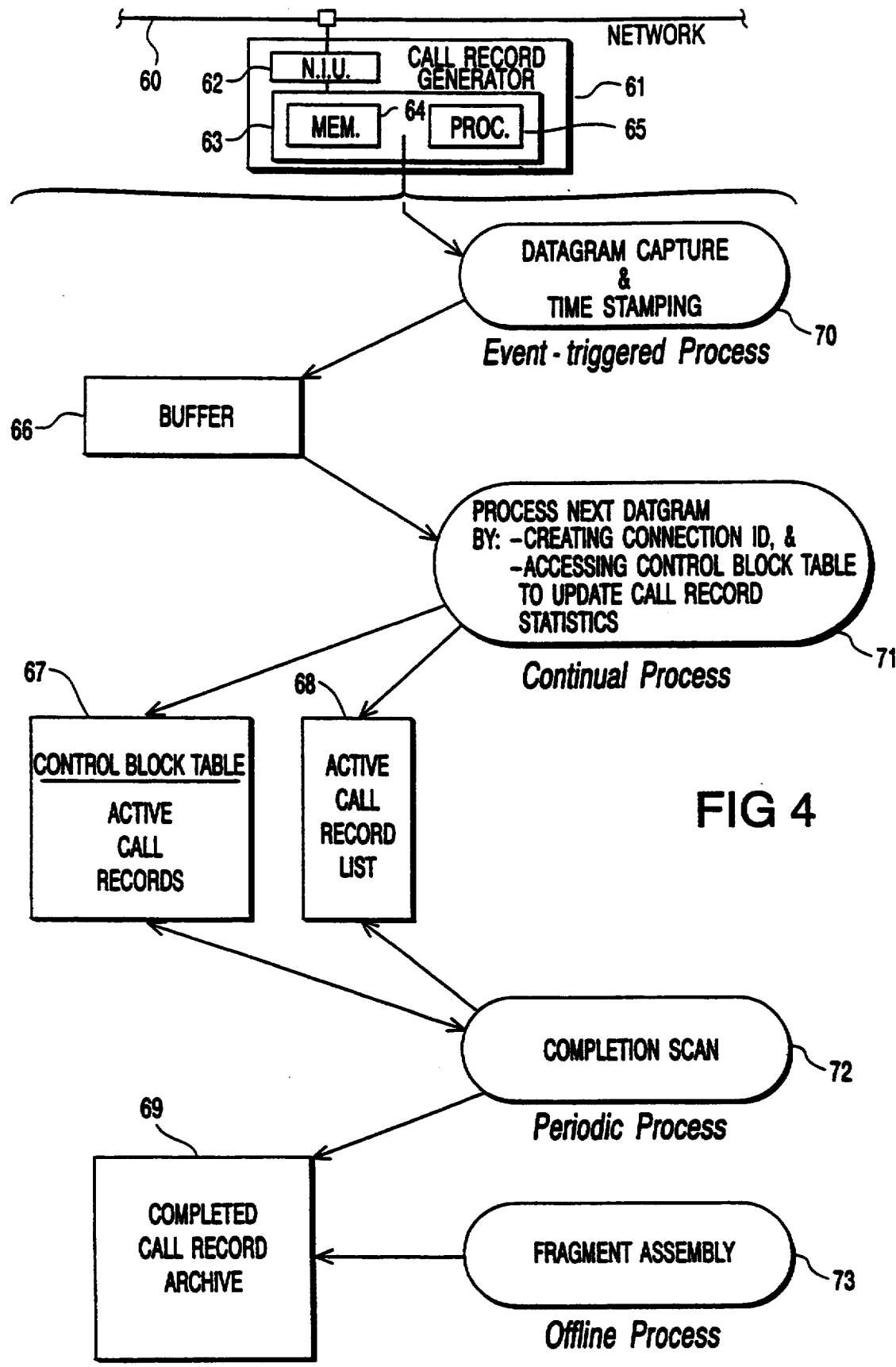
FIG. 4 is a diagram illustrating the main processes and data structures employed in the network monitoring method.

FIG. 4 illustrates the call record generator 61 embodying the present invention, the call record generator 61 being connected to monitor a network 60 in order to provide a record of each TCP connection (or call) temporarily established over the network. As can be seen, the call record generator 61 comprises a network interface unit 62 connected to the network 60 and a processing sub-system 63 including a processor 65 and memory 64. The memory 64 will generally comprise working RAM memory, ROM memory for program storage, and disk memory (these elements are not individually shown in FIG. 4 for reasons of clarity).

The network interface unit 62 captures each frame 45 appearing on the network and passes it to the processor sub-system 63 for processing.

As illustrated in FIG. 4, the processing sub-system 63 utilizes four main data structures 66–69 and executes four main processes 70–73.

More particularly, upon a frame being passed to the processing sub-system 63, the process 70 is initiated (for example as an interrupt service routine) to extract datagram information from the frame and store the datagram, together with a time stamp, in a buffer constituted by the data structure 66. The stored datagram information will generally only comprise the information of interest, namely the IP header and the header of the encapsulated TCP segment; furthermore, if the datagram has been subject to fragmentation, then only the first fragment, containing the IP header and the header of the encapsulated TCP segment, is processed, all other fragments being discarded.

The process 71 which runs in background continuously monitors the buffer 66 for new entries and whenever one or more entries are present, extracts the head entry for processing. As will be more fully described hereinafter, this processing involves identifying the connection to which the head entry damgram belongs and then updating a corresponding call record for that connection, the call records for active connections being held in a control block table constituted by the data structure 67. If a datagram corresponds to a connection for which no call record exists in the control block table 67, then a new record is created by the process 71. The process 71 also keeps a separate linked list of active call records, this list constituting the data structure 68. Each call record contains statistics on the corresponding TCP connection as will be more fully described hereinafter with reference to FIG. 5.

At periodic intervals a completion scan process 72 is run which scans the call records in the control block table 67 and removes any records which have been inactive for a given minimum period (by "inactive" is here meant that the record has not been updated in response to receipt of a further datagram associated with the connection concerned). The process 72 uses the linked list 68 of call records to carry out the scanning of the call records. Any call records identified as inactive by the process 72 are removed to a completed call record archive constituted by the data structure 69 (this archive is, for example, kept in disk storage or held off-line rather than being stored in RAM).

Finally, a call-record fragment assembly process 73 which is an offline process, is used to examine the call records contained in the archive 69 for records which in fact constitutes call record fragments relating to the same connection, as will be explained more fully below.

A fundamental requirement of the overall call record generation process is, of course, that a unique connection identifier can be formed from each captured IP datagram with this identifier being the same regardless of which of the two endpoint entities generated the captured datagram. In the present example, this unique connection identifier, which is generated by the process 71, is formed by the tuple of (IP address, TC port) of each endpoint entity with the numerically greater address plus port number always being placed first. For example, if an IP datagram is captured in which the source IP address is 15.8.61.123 and the source TC port is 123, whilst the destination IP address is 16.8.9.123 and the destination TCP port is 111, then the resulting connection identifier would be ((16.8.9.123,111),(15.8.61.123,123)). More generally, if the endpoint entity A has a four byte IP address made up of bytes aIp1 to aIP4 and a two byte TCP port number made up of bytes aPort1 and aPort2, and the endpoint entity B similarly has a four byte IP address made up of bytes bIP1 to bIP4 and a 2-byte TCP port number made up of bytes bPort1 and bPort2, then the connection identifier will be:

([aIP1.aIP2.aIP3.aIP4], [aPort1.aPort2]) ([bIP1.bIP2.bIP3.bIP4], [bPort1.bPort2]) where (aIP.aPort>bIP.bPort)

This connection identifier is, as already noted above, generated by the process 71. In fact, the connection identifier is not used directly to access the corresponding call record in the control block table 67 as, instead a hash key is created from the connection identifier and used to hash into the control block table 67. In the present embodiment the hash key used is:

(aIP4,bPort2,aPort2,bIP4)

Figure 5:
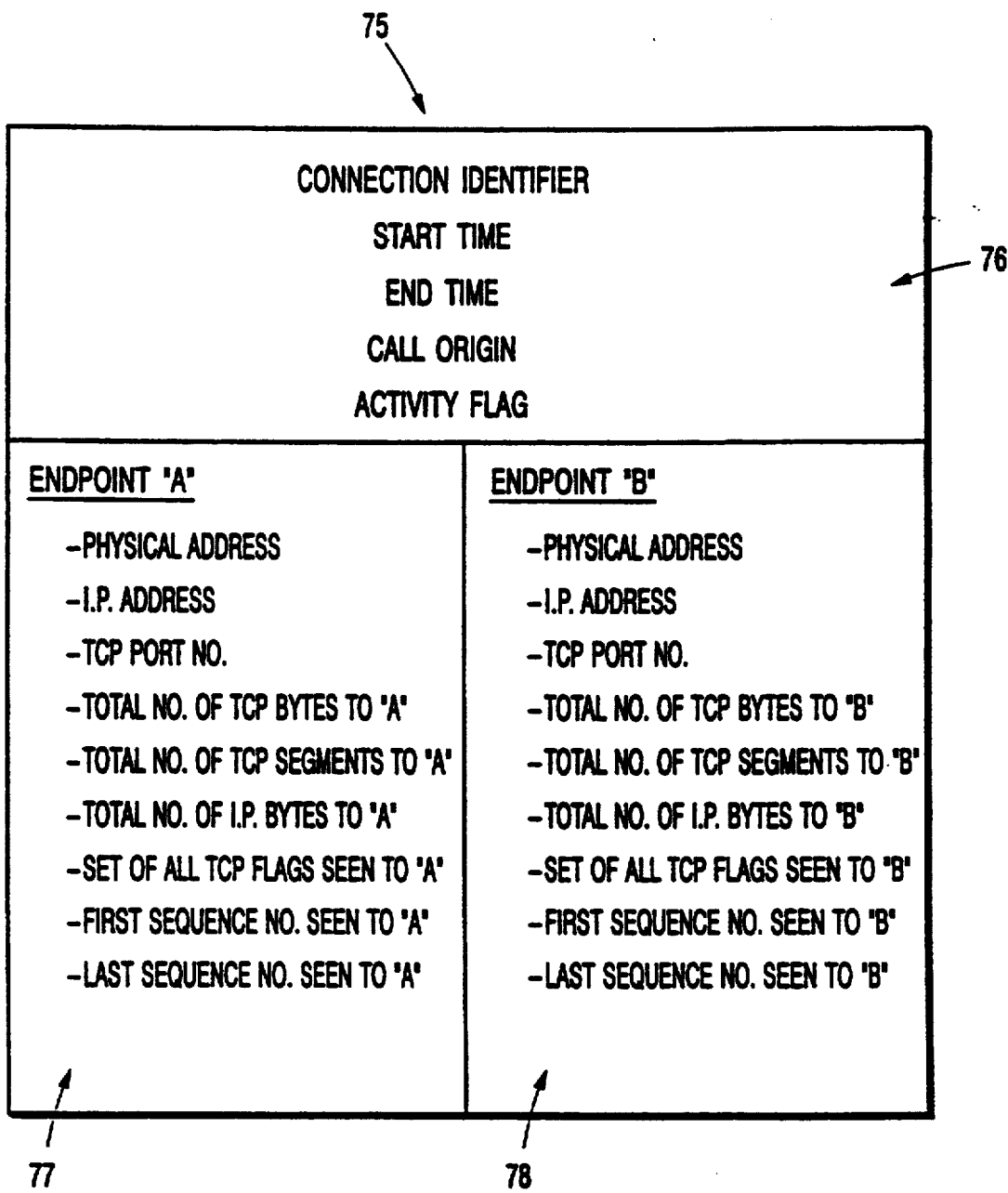
FIG. 5 illustrates the contents of a call record constructed during the network monitoring method.

The contents of each call record are illustrated in FIG. 5. As can be seen each call record includes a first group of fields containing the connection identifier for the connection to which the call record relates, a start time field corresponding to the time stamp associated by the process 70 with the IP datagram giving rise to the generation of the call record, an end time field corresponding to the time stamp associated with the most recently received datagram used to update the call record 75, a call origin field containing an indication of which endpoint entity initiated the connection, and an activity flag field used in the determination of whether or not the record is still active. In addition to these general fields, each call record 75 includes two groups of fields 77,78 relating to the statistics of the call in each of the two directions. Thus, in relation to endpoint entity A, the call record 75 includes fields containing the physical address of A (this information is extracted from each frame received by the call record generator and stored along with the datagram information by the process 70), the IP address and TCP port number of endpoint entity A, the total number of TCP bytes sent to endpoint A, the total number of TCP segments sent to endpoint A, the total number of IP bytes sent to endpoint A, a cumulative set of all TCP flags sent to A, the first sequence number sent to A and the last sequence number sent to A. Corresponding fields are present in the record 75 for the endpoint entity B.

The reason sequence numbers are collected is to validate the total number of TC bytes sent in a particular direction. For any given direction, the second sequence number minus the first sequence number will give an approximate indication of the total number of TCP bytes sent in that direction; this indication is only approximate because there are cases, namely ACK segments, where no TCP data is present but the sequence number is incremented by 1. The set of all TCP flags seen is collected to facilitate call record fragment reassembly carried out by process 73.

A more detailed description regarding the generation and updating of call records by process 71 will now be given with reference to the flow diagram illustrated in FIG. o 6. Once initiated, the process 71 continually checks the buffer 66 (step 81) until it detects that a datagram with its associated time stamp has been entered into the buffer. Thereupon the process 71 retrieves the head entry from the buffer 66 (step 82) and constructs the connection identifier for the head entry datagram (step 83). The process 71 also constructs the corresponding hash key for the connection (step 84) and then attempts to access the control block table 67 using this hash key (step 85). An open hashing technique is used, that is, collision resolution is achieved by maintaining separate overflow areas for each entry in the hash table 67. If no entry is found at the location indicated by the hash key, then it is assumed that the datagram being processed relates to a new connection (step 86); if, however, a matching entry is found at the location indicated by the hash key, then it is assumed that the datagram relates to the connection associated with the call record at that location.

Considering first the situation where a new connection is assumed, the process 71 now proceeds to create a new call record 75 in the control block table 67 (step 87) and to update the active record list 68 (step 88). In creating the new call record, the process 71 enters the connection identifier in the corresponding record field and also fills in the start time and call origin fields (step 89). As already noted, the start time field, is used to hold the time stamp associated with the datagram initiating call record generation. The call origin field of the call record 75 contains an indication as to which end point entity of the connection originated the call. This information is inferred from the TCP code bits in the datagram initiating call record generation, it being appreciated that this first datagram will generally be one involved in the establishment of the TCP connection concerned so that the code bits in the TCP header will follow the sequence illustrated in the top half of FIG. 3. In particular, there are three main cases to consider:

1. The TCP code bits contain only a SYN which implies that this is the first datagram for the connection so that the connection origin is the endpoint entity identified by the source address in the datagram;

2. The TCP code bits contain both a SYN and an ACK thereby indicating that the datagram relates to a response to a connection request so that the originating entity for the connection is the one identified by the datagram's destination address;

3. The code bit flags do not contain a SYN; this indicates that the connection establishment phase has been missed.

In the last of the three cases, the call origin field of the call record 75 is set to contain an indication that the origin is unknown.

In generating a new call record 75, the process 71 also enters for each endpoint entity, the physical address, IP address and TCP port number of that entity (step 90).

Further entries in a call record 75 are made by the process 71 in steps 91 and 92, these entries being made both for a newly created call record and for a call record corresponding to an existing connection. In step 91, the end time field of the call record is set to the time stamp of the datagram being processed by process 71 (of course, for a newly-created call record, the end time will correspond to the start time); in addition, the activity flag of the call record is set. In step 92, statistics relating to the receiving endpoint entity are updated. In particular, the first sequence number is entered in the call record if not already present, the number of TCP bytes, TCP segments, and IP bytes are updated, the accumulated set of TCP flags is updated, and the last sequence number seen is entered.

After completion of step 92, process 71 returns to checking for an entry to be processed in buffer 66 (step 81).

In this manner the process 71 builds up a record of each call conducted over the network.

Figure 7:
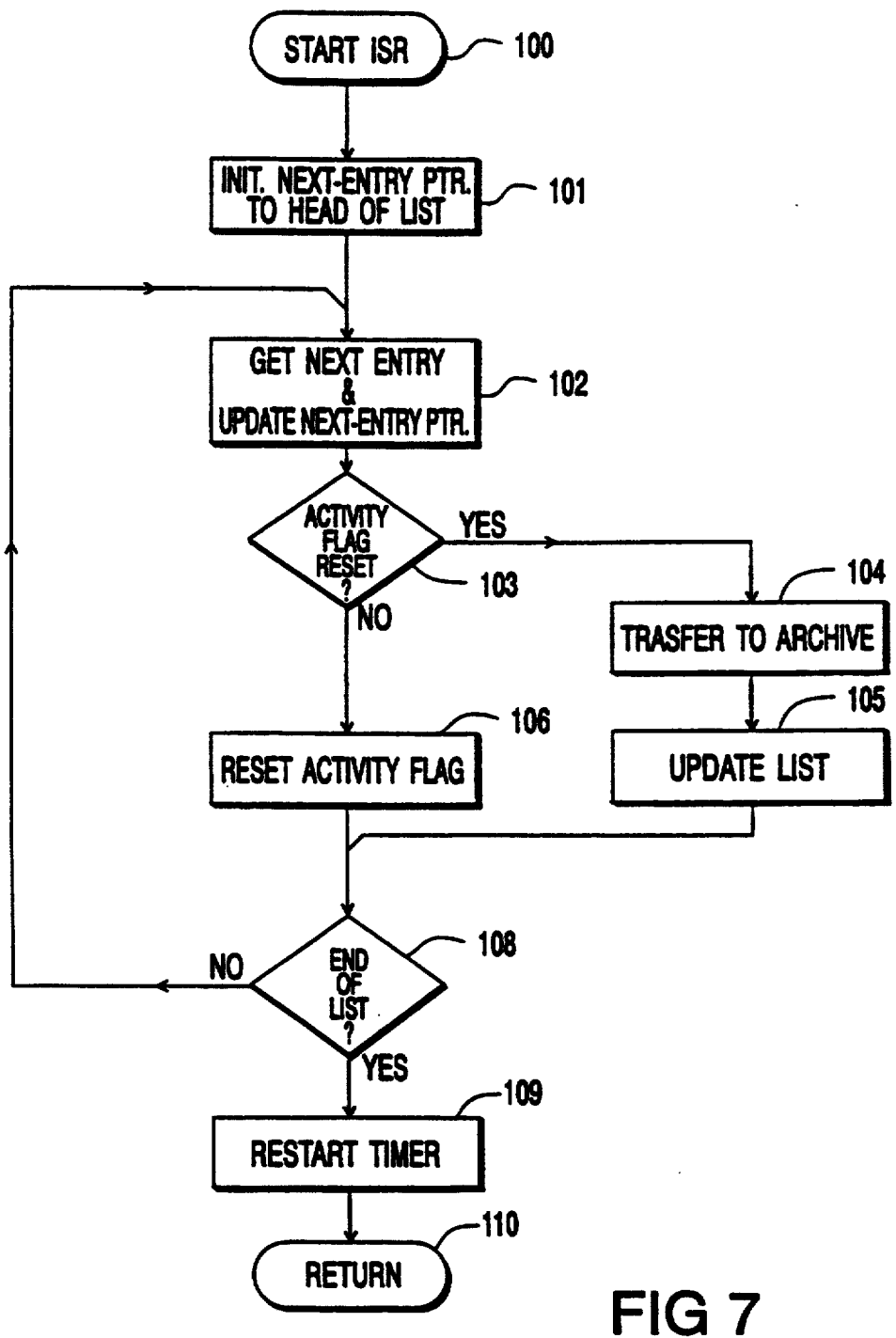
FIG. 7 is a flow diagram of a "Completion Scan" process illustrated in FIG. 4.

The removal of calls corresponding to connections which have terminated from the group of active call records in control block table 67 is effected by the completion scan process 72. This process 72 is illustrated in flow chart form in FIG. 7. More particularly, at periodic time intervals, for example once every three minutes, set by an interrupt timer, the process 72 is started (step 100) and a next-entry pointer is initialised to point to the head of the active call record list 68 (step 101). Thereafter, the list entry pointed to by the next-entry pointer is fetched (step 102) and the next-entry pointer is updated to point to the subsequent list entry, if any. Next, the activity flag of the call record identified by the fetched list entry is examined (step 103). If this activity flag is in a reset state this indicates that the call record has not been created or updated since the last running of the completion scan processor 72 (it being recalled that the activity flag is set by process 71 during creation/updating of a call record); these records are taken as relating to completed connections and, accordingly, the process 72 proceeds to remove these records from the active call record group held in table 67 and transfer them to the completed call record archive 69 (step 104). Thereafter, the process 72 updates the active call list 68 by removing the entry corresponding to the transferred call record.

In the event of the activity flag of the call record checked in step 103 being in a set state, it is assumed that the corresponding connection is still active and the call record is left in the control block table 67; however, its activity flag is reset (step 106).

After the completion of step 105 or 106 as appropriate, the process 72 proceeds to step 108 in which it checks whether any more entries are present in the list 68 as indicated by the next-entry pointer. If further entries are present, then the process loops back to step 102. However, if all entries in the list have been processed, process 72 restarts the interrupt timer used to time the intervals between successive scans by the process 72 (step 109) and then terminates (step 110).

It will be appreciated that if an existing call record is not updated in the period between successive scans, then it will be removed from the active call group held in the control block table 67 during the running of the later of the completion scan process 72. In the present example, the interval between successive runs of the process 72 is three minutes. However, other intervals are possible although the intervals should be longer than 45 seconds as this is the interval that TCP keep-alive packets are sent on certain types of TCP connection. The choice of interval comes down to a trade-off between using up space in the table 67 for idle/complete connections, the amount of time required to scan the active call group, and the amount of off-line call record fragment reassembly that needs to be done to build up complete call records from previously generated incomplete ones (the process 73 illustrated in FIG. 4). The advantages of the above-described process 72 is that it obviates the need to check all datagrams to see if it is the last one to be sent for a particular TCP connection and this reduces the processing time per datagram. Furthermore, the process 72 is still effective even if the datagrams containing the connection close-down sequence are lost.

Of course, if a connection should be idle longer than the interval between successive runnings of the completion-scan process 72, the corresponding call record will be removed from the table 67 before the connection is complete. The remainder of the connection transaction will then be logged as a separate connection with its own call record being created. As a consequence, a number of partially complete call records between the same endpoint entities may be generated. However, the call-record fragment assembly process 73 is used to reassemble these call record fragments by reference to the code bits noted in the TCP flag field of each call record. More particularly, by using the TCP flag list and the start and end times, the process 73 pieces together call record fragments into a set of complete call records. For example, a call record might be split into three calls and the TCP flag list of each of the call records might be as follows:

Record 1 - SYN, ACK, PUSH
Record 2 - ACK, PUSH
Record 3 - ACK, PUSH, FIN

Given that a normal call should have a flag list containing a SYN, ACK, and FIN (see FIG. 3) and generally also PUSH, then it is fairly certain that the above three call records are for the same connection (assuming that the start and finish times match appropriately). This process, does not, of course, guarantee that every call fragment will be picked up successfully, but the majority will.

It will be appreciated that many variations are possible to the above-call record generator and monitoring method. In particular, it will be appreciated that the call record generator and monitoring method can be applied to monitoring of connections other than TCP connections. Furthermore, a filter could be incorporated into the call record generator to filter out certain categories of frames so that, for example, the call record generator only generated records in respect of calls sourced from a particular network node or sub-network. With regard to the detailed implementation of the call record generator, one possible variant would be for the completion-scan process 72 to use the end time field of each call record to judge whether the corresponding connection is still active. In this case, the contents of the end time field would be compared to the current time as provided by the time stamp timing source. Such an arrangement would obviate the need for an activity flag field. Another possible variant would be to store both the active and completed call records in the same memory and distinguish the members of each group from each other by an appropriate flag associated with each record. Furthermore, it will be appreciated that it is not essential to use a hash table for accessing the active call records.

I claim:
1. A method of monitoring communication connections temporarily established over a network for passing protocol data units between at least several entities, each protocol data unit passed over the network being provided by a sending entity with associated connection information identifying the connection to which it relates, the method comprising the steps of monitoring the network to identify said protocol data units and the connection to which each such unit relates, and maintaining an active group of call records each representing a respective said connection considered to be currently active, said maintaining step comprising:

adding a new call record to said active group each time one of said protocol data units is identified by the monitoring step as relating to a connection that is not represented in said active group;

updating an existing call record in said active group in response to any further of said protocol data units being identified by the monitoring step as relevant to the connection represented by said existing call record;

detecting that said connection has been completed, the detecting step being performed with regard to a continuing absence of further protocol data units relevant to said connection; and removing several ones of said existing call records from said active group when said connection has been detected as being completed.

2. A method according to claim 1, wherein each call record in said active group is provided with a respective activity indicator which is set when the record is created and when the record is updated, the removal of call records from said active group being effected by checking the call records of the active group at intervals and each time removing those records whose activity indicators are in a reset state and resetting the activity indicators of the other records to a previous state.

3. A method according to claim 1, wherein the call records removed from said active group are retained as a completed-call group of records.

4. A method according to claim 3, wherein at least some of said protocol data units have associated control codes relevant to the progression of the connections to which they relate, said step of monitoring the network including identifying said control codes associated with said protocol data units, and said maintaining step further including, for each said call record of said active group, storing as part of that record the control codes relevant to the connection represented by said record; said method further including the step of scanning the call records of said completed-call group for records relating to connections between the same pair of entities, determining from the control codes stored in such records whether the records constitute partial records of the same connection, and combining said records in response to the records being determined as constituting partial records of the same connection.

5. A method according to claim 1, wherein each said call record of said active group includes a start-of-call information item set upon creation of that record to indicate a start time of the corresponding connection, and an end-of-call information item which is updated for each protocol data unit subsequently identified as relevant to that record to indicate a potential end time of the corresponding connection.

6. A method according to claim 5, further including providing a time stamp when each protocol data unit is identified, wherein said step of monitoring the network includes associating a respective one of the time stamps with each of said protocol data units that is identified in that step; said start-of-call information item of each said call record being set to the time stamp of the protocol data unit causing the call record to be created, and the end-of-call information item of the same record being set in turn to the time stamp of each successive protocol data unit identified as relevant to the connection represented by that record.

7. A method according to claim 1, wherein at least some of said protocol data units have associated control codes relevant to the establishment of the connections to which they relate, said step of monitoring the network including identifying said control codes associated with said protocol data units, and said maintaining step further involving, for each said call record added to said active group, determining from the said control codes relevant to the connection represented by that record, which entity of said pair of entities associated with that connection initiated the connection, the identity of the initiating entity being stored in said call record.

8. A method according to claim 1, wherein said step of monitoring the network further involves determining for each identified said protocol data unit, both quantitative information related to that protocol data unit, and in which direction the unit is being passed between the said pair of entities associated with the said connection to which the protocol data unit relates; said maintaining step being such that each said call record contains respective aggregated said quantitative information for the protocol data units relevant to each said direction between said pair of entities.

9. A method according to claim 1, wherein said associated connection information of each protocol data unit comprises the network addresses of each of the entities of said pair of entities associated with the connection to which the protocol data unit relates, said step of monitoring the network involving identifying the said connection to which each said protocol data unit relates by forming a connection identifier from the network addresses contained in said associated connection information in a manner such that said connection identifier has a form that is independent of the direction of passage of the protocol data unit between said entities, said connection identifier being used in said maintaining step to identify the corresponding said call record.

10. A method according to claim 9, wherein said maintaining step involves storing the said call records of said active group in a hash table with the call record relevant to a particular said protocol data unit being accessed in said hash table by use of a hash key formed from the said connection identifier associated with that protocol data unit.

11. Apparatus for monitoring communication connections temporarily established over a network for passing protocol data units between at least several entities, each protocol data unit passed over the network being provided by the sending entity with associated connection information identifying the connection to which it relates, said apparatus comprising monitoring means for monitoring the network to identify said protocol data units and the connection to which each such unit relates, and call-record means connected to said monitoring means and operative to maintain an active group of call records each representing a respective said connection considered to be currently active, said call-record means comprising:

storage means for storing said active group of call records, record-creation means for determining whether the said connection to which each said protocol data unit relates, as identified by said monitoring means, is represented by a said call record in said active group, and where said connection is determined to be unrepresented by a said call record, adding a new call record to said active group;

means for detecting when said connecting has been completed, the connection being detected as being completed with regard to a continuing absence of further protocol data units relevant to said connection, record-updating means for modifying said storage means so an existing call record in said active group is updated in response to any further said protocol data units being identified by said monitoring means as relevant to the connection represented by that record; and record-removal means for modifying said storage means so an existing call record is removed from said active group when said means for detecting detects that the connection is completed.

* * * * *

UNITED STATES PATENT AND TRADEMARK OFFICE
CERTIFICATE OF CORRECTION

PATENT NO. : 5,430,709
DATED : July 4, 1995
INVENTOR(S) : James GALLOWAY

Figure 6:
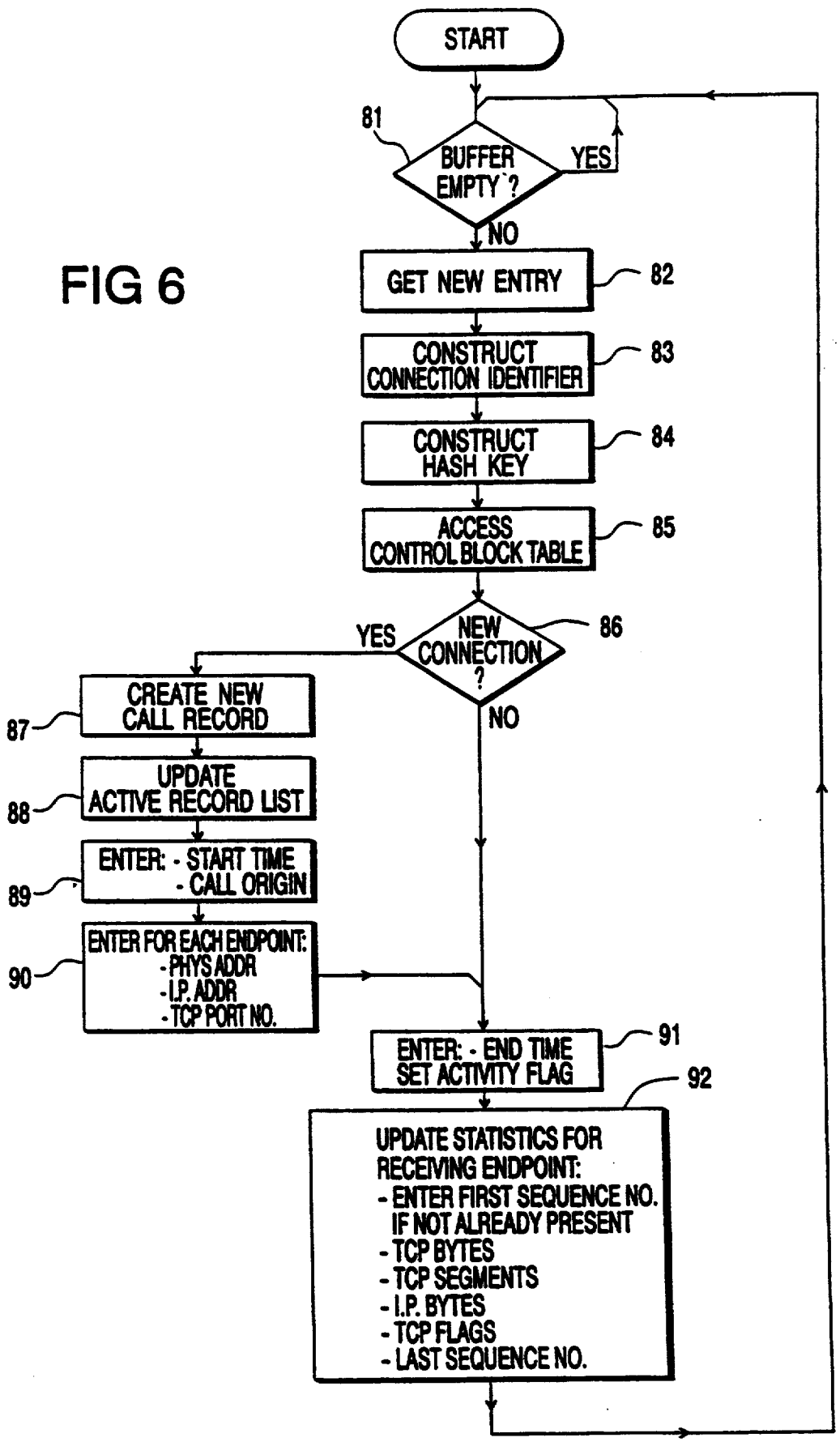
FIG. 6 is a flow diagram of a "Process Next Datagram" process illustrated in FIG. 4.

It is certified that error appears in the above-indentified patent and that said Letters Patent is hereby corrected as shown below:

```
Column 5, line 7, change "dam" to --data--;
Column 7, line 39, change "dam" to --data--;
Column 9, line 57, change "FIG. o 6" to --FIG. 6--;
Column 13, line 5, delete "several ones of"
Column 13, line 5, change "records" to --record
corresponding with the detected connection--.
```

Signed and Sealed this

Twenty-third Day of July, 1996

Attest:

BRUCE LEHMAN

*Attesting Officer*      *Commissioner of Patents and Trademarks*